US012646084B2

(12) United States Patent
Westphal

(10) Patent No.: US 12,646,084 B2
(45) Date of Patent: Jun. 2, 2026

(54) SYSTEMS AND METHODS FOR PROVIDING NAVIGATION TENDENCIES TO USERS OF A WEBSITE

(71) Applicant: W.W. Grainger, Inc., Lake Forest, IL (US)

(72) Inventor: Geoffry A. Westphal, Evanston, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 240 days.

(21) Appl. No.: 17/692,365

(22) Filed: Mar. 11, 2022

(65) Prior Publication Data

US 2022/0270118 A1 Aug. 25, 2022

Related U.S. Application Data

(63) Continuation of application No. 13/731,291, filed on Dec. 31, 2012, now Pat. No. 11,301,876.

(51) Int. Cl.
*G06Q 30/0201* (2023.01)

(52) U.S. Cl.
CPC .............................. *G06Q 30/0201* (2013.01)

(58) Field of Classification Search
CPC ...................................................... G06Q 10/30
See application file for complete search history.

(56) References Cited

U.S. PATENT DOCUMENTS 6,564,213 B1 * 5/2003 Ortega ................ G06F 16/3322
                                           707/999.005
6,877,007 B1 4/2005 Hentzel et al.

7,353,460 B2 4/2008 Tu
11,250,081 B1 2/2022 Cowburn et al.
11,301,876 B2 4/2022 Westphal
2002/0019763 A1 * 2/2002 Linden ............... G06Q 30/0253
                                              705/14.53
2004/0095383 A1 5/2004 Pfeifer et al.
(Continued)

OTHER PUBLICATIONS

M. C. Burton and J. B. Walther, "A survey of web log data and their application in use-based design," Proceedings of the 34th Annual Hawaii International Conference on System Sciences, Maui, Hi, USA, 2001, p. 10 pp. -, doi: 10.1109/HICSS.2001.926541. (Year: 2001).*

(Continued)

*Primary Examiner* — Rutao Wu
*Assistant Examiner* — Zahra Elkassaggi
(74) *Attorney, Agent, or Firm* — Barnes & Thornburg LLP

(57) ABSTRACT

The example systems and methods provide ways for websites to monitor, store, retrieve, and display navigation tendencies of users of websites. More particularly, the systems and methods involve websites displaying measures of user traffic associated with various categories of web content. The measures of user traffic may inform a user of how the user previously navigated the various hierarchical categories of web content, or the measures of user traffic may inform a user of how others navigate the various hierarchical categories of web content. Moreover, the user may select an identifiable group of users for which the website will display navigation tendencies. In the alternative, the website may display navigation tendencies of an identifiable group of users based on an identity of the user viewing the website.

8 Claims, 7 Drawing Sheets

(56) References Cited

U.S. PATENT DOCUMENTS

| | | | |
|---|---|---|---|
| 2005/0044139 A1* | 2/2005 | Christian | G06Q 30/02 |
| | | | 709/246 |
| 2006/0064411 A1* | 3/2006 | Gross | G06F 16/9535 |
| 2006/0085766 A1 | 4/2006 | Dominowska et al. | |
| 2006/0129549 A1* | 6/2006 | Bozak | G06F 16/951 |
| | | | 707/999.005 |
| 2009/0150392 A1* | 6/2009 | Westphal | G06F 16/951 |
| | | | 707/999.005 |
| 2009/0164940 A1 | 6/2009 | Wampler | |
| 2009/0271514 A1 | 10/2009 | Thomas | |
| 2010/0161540 A1 | 6/2010 | Anisimov et al. | |
| 2011/0252329 A1 | 10/2011 | Broman | |
| 2016/0246888 A1* | 8/2016 | Burkard | G06F 16/9535 |

OTHER PUBLICATIONS

S. Hernández, P. Álvarez, J. Fabra and J. Ezpeleta, "Analysis of Users' Behavior in Structured e-Commerce Websites," in IEEE Access, vol. 5, pp. 11941-11958, 2017, doi: 10.1109/ACCESS.2017. 2707600. keywords: {Data mining;Tools;Web servers;Model checking;Navigation;Analytical models;Web pages;Data mining;e-commerc.*

Non-final Office Action in U.S. Appl. No. 13/731,291, dated Jan. 15, 2015, 20 pp.

Final Office Action in U.S. Appl. No. 13/731,291, dated Oct. 6, 2015, 16 pp.

Non-final Office Action in U.S. Appl. No. 13/731,291, dated Jan. 20, 2016, 17 pp.

Final Office Action in U.S. Appl. No. 13/731,291, dated Jul. 14, 2016, 25 pp.

Non-final Office Action in U.S. Appl. No. 13/731,291, dated Apr. 5, 2019, 18 pp.

Final Office Action in U.S. Appl. No. 13/731,291, dated Oct. 10, 2019, 13 pp.

* cited by examiner

FIG. 7

📖 Catalog I Find a Branch I 🛒 Cart Containers: (0) Items

GRAINGER FOR THE ONES WHO GET IT DONE

| PRODUCTS | RESOURCES | SERVICES | WORLDWIDE | REPAIR PARTS | Enter keyword or part number | Search |

Home / Hand Tools / Hammers and Striking Tools ⊠ / Claw/Rip/Framing Hammers ⊠

340 →

Search within these results [Go]

131 Products Found          View [16 per page] ▾

Sort by [Top Sellers ▾]          <Prev 1 2 3 4 5 ... 9 Next>

Change Display: ▦ List ▣▣ Grid

Refine By

Item
- ☐ California Hammer   (2 visits)
- ☐ Claw Hammer ← 342
- ☐ Concrete Form Claw
- ☐ Electrical
- ☐ Curved Claw Hammer
- ☐ Double Face Hammer
- ☐ Electricians Straight Claw
- View More

344 ⟨

Type
- ☐ Antivibe
- ☐ BlueNax(R)   342
- ☐ California
- ☐ Claw  (2 visits)
- ☐ Curved Claw
- ☐ Dead Blow
- View More

346 ⟨

Head Weight (10oz)
- ☐ 13
- ☐ 14   (2 visits)
- ☐ 15   342
- ☐ 16
- ☐ 17   (1 visits)
- ☐ 18
- View More

348 ⟨

[Compare]

☐ Add to compare $24.78   Sale Price $16.34

Item #: 4YR57
Claw Hammer, 16 Oz, Smooth, Fiberglass

Product Details
Quantity: [1]
🛒 Add to Order

☆ ☆ ☆ ☆ ☆ Be the First to Write a Review

☐ Add to compare $15.99

Item #: 6GRJ7
Rip Claw Hammer, Fiberglass, Smooth, 16

Product Details
Quantity: [1]
🛒 Add to Order

☆ ☆ ☆ ☆ ☆ Be the First to Write a Review

☐ Add to compare $11.42

Item #: 6R252
Claw Hammer, 16 Oz, Polished, Hickory

Product Details
Quantity: [1]
🛒 Add to Order

☆ ☆ ☆ ☆ ☆ Be the First to Write a Review

☐ Add to compare $21.35

Item #: 4YR58
Hammer, Rip, Round Face

Product Details
Quantity: [1]
🛒 Add to Order

☆ ☆ ☆ ☆ ☆ Be the First to Write a Review

☐ Add to compare $31.55

Item #: 4A096

☐ Add to compare $15.99

Item #: 6GRJ6

☐ Add to compare $10.54

Item #: 3FRD3

☐ Add to compare $21.35

Item #: 4YR58

SYSTEMS AND METHODS FOR PROVIDING NAVIGATION TENDENCIES TO USERS OF A WEBSITE

RELATED APPLICATION INFORMATION

The present disclosure claims the benefit of and is a continuation of U.S. application Ser. No. 13/731,291, filed on Dec. 31, 2012, the disclosure of which is incorporated herein by reference in its entirety.

BACKGROUND

In the art it is known to monitor interactions of a user with a website. For example, U.S. Pat. No. 6,877,007, which is incorporated herein by reference in its entirety, describes a system and method that track interactions of a user with content provided by a website. To this end, input made by a user as the user interacts with webpages that comprise the website, such as mouse movements, button clicks, typing, etc., is streamed back to a tracking server and stored. The stored information related to the user's interactions with the website may then be analyzed and used, for example, to redesign the website so as to make it more user-friendly or more easily navigable. As a further example, U.S. Patent Publication No. 2005/0044139, which is also incorporated herein by reference in its entirety, describes a system and method in which interactions of a user with a website are monitored by keeping logs of clicks on webpage links. For this purpose, a website developer includes a link identifier in a selectable link of a webpage. When the selectable link is clicked on by a user of the website, the link identifier triggers a click tracking system to initiate click tracking for that particular link. The click on the link is then logged by a tracking server and the user is redirected to a destination specified in the link. Usage patterns may then be derived from statistics generated from the log files on the tracking server.

Further, customers using e-commerce websites typically visit the websites several times before making purchases. During each subsequent visit to a website, customers re-navigate the website searching for the same or similar products or services. Despite detailed tracking methodologies such as those described in U.S. Pat. No. 6,877,007 and U.S. Patent Publication No. 2005/0044139, however, no known websites provide customers with information that shows which categories and subcategories of products or services customers previously navigated. In other words, customers are essentially on their own in terms of re-navigating a website's menus, categories, hierarchies, layout, etc. Therefore, a need remains for systems and methods that allow a user of a website to view how the user tends, or how other users tend, to navigate the website.

BRIEF DESCRIPTION OF THE DRAWINGS

For a better understanding of the disclosed systems and methods for providing website navigation tendencies to users of a website, reference may be had to examples shown in the following drawings in which:

FIG. 7 is a screenshot of an example webpage showing measures of user traffic that are attributable to one particular user.

DETAILED DESCRIPTION

To address the aforementioned need and other needs, disclosed hereinafter are systems and methods that use information gained from monitoring interactions of users with a website to enhance visits by others and subsequent visits by the same users. In one example, by recording data about the interactions of users with the website, the systems and methods may cause a website to display information showing navigation tendencies of a user, of other users, or of a particular subset of users. More particularly, the example web site may display information regarding how many visits certain categories, subcategories, etc. of web content have experienced recently.

Further, users of a website can learn how similarly-situated users are navigating through a website. For example, if the website identifies a particular user as being a custodian, for instance, the website may display navigation tendencies of custodians that use the website. The user may then view how others with similar interests navigate the website. Moreover, users who are less familiar with a website can view the navigation tendencies of others that are more familiar with the website. By viewing the navigation tendencies of more-experienced users, less-experienced users can learn about new categories of web content and popular categories of web content provided by the website. Another benefit, for example, may be that users of the website who are purchasers on behalf of a business will discover other products or services offered by the website, thereby allowing the business to downsize the number of vendors it uses.

While the foregoing generally disclose systems and methods for providing website navigation tendencies to users, a better understanding of the objects, advantages, features, properties, and relationships of the systems and methods will be obtained from the following detailed description and accompanying drawings which set forth illustrative examples which are indicative of the various ways in which the principles of the disclosure may be employed.

Figure 1:
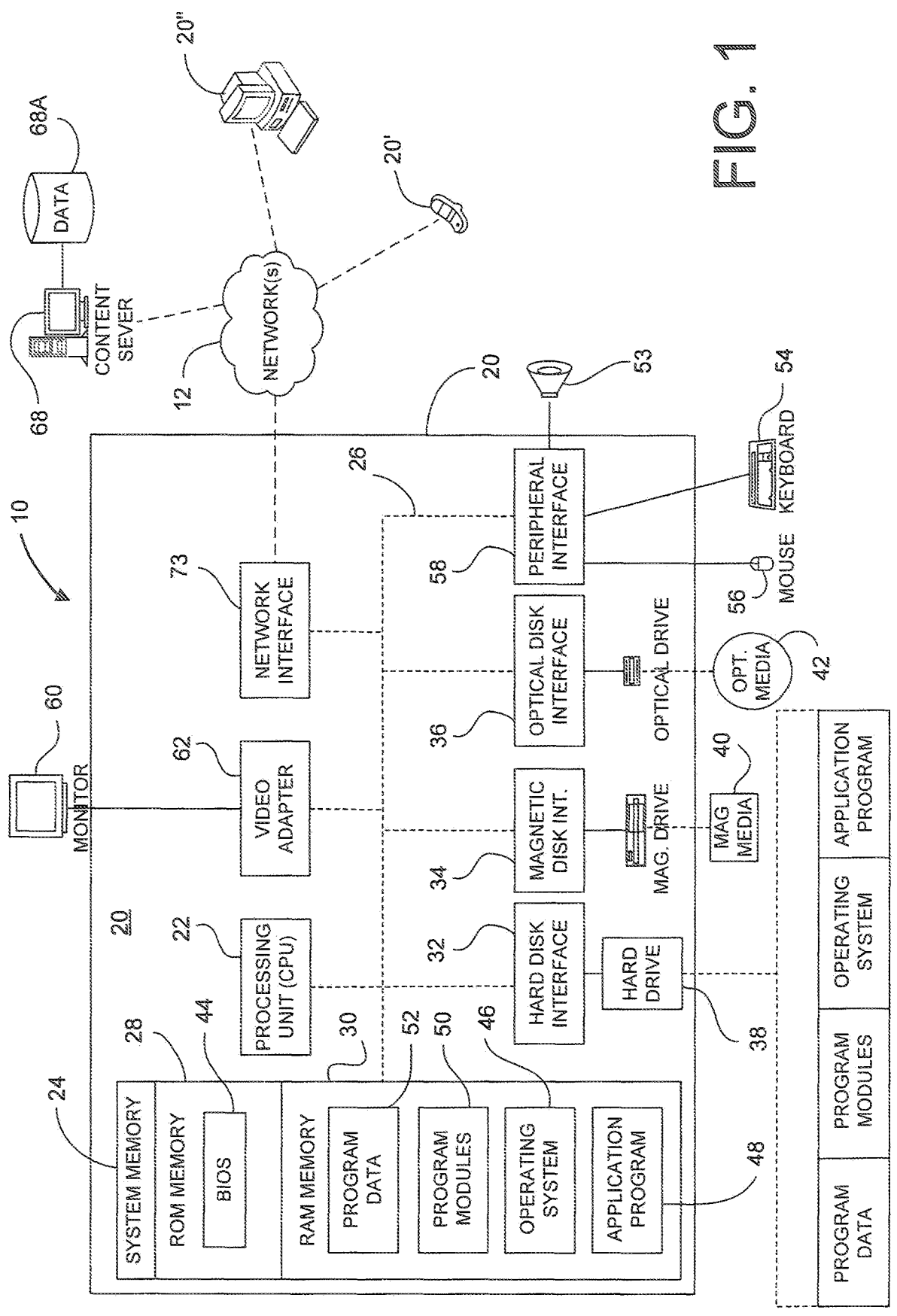
FIG. 1 is a block diagram illustrating components of an example network system in which the disclosed methods may be employed.

With reference now to the figures, the following discloses example systems and methods for providing website navigation tendencies to users of a website. As illustrated in FIG. 1, a system 10 will be disclosed in the context of a plurality of processing devices linked via a network 12, such as the World Wide Web or the Internet. In this regard, a user processing device 20, illustrated in the example form of a computer system, a user processing device 20', illustrated in the example form of a mobile device, or a user processing device 20", illustrated in the example form of a personal computer, provides a means for a user to access a website content server 68 via the network 12 and thereby gain access to content, such as media, data, webpages, an electronic catalog, etc., stored in a repository 68A associated with the content server 68. Furthermore, the website content server 68 and/or the user devices 20, 20', 20" include functionality which allows the system 10 to monitor how a user interacts with the website content offered via the website content server 68.

By way of non-limiting example, the system 10 monitors user interactions with a website by recording events, accessed content, and other data such as the following: keyword searches; model number searches; stock-keeping unit (SKU) searches; parameters used in searches; selection guides; clicked links; links that a user's mouse hovered over for a measurable period of time; accessed menus, categories of product, subcategories of product, and the like; products viewed; number of products viewed; product images that were magnified; product comparisons; times during which webpages or other content was viewed or accessed; duration of stay; dialogs of chat sessions; audio recordings of telephonic conversations between the user and a customer service representative; identities of employees with which the user interacts; notes from users, peers (e.g., another company employee or an employee from another company), service representatives, or technical representatives; order histories; pending orders; user alerts; user preferences; personal information (e.g., created by or provided for the user); information that is related to the user via the user's membership in a group; referring websites; transfer websites; and so on. In short, the disclosed systems and methods may in some examples record virtually all aspects of users' visits to the website while still adhering to all relevant privacy regulations.

To enhance users' visits and return visits to the website, as disclosed below, such information relevant to users' interactions with and navigation of the content offered by the website content server 68 are stored and provided to new users and repeat users. In one example, information relevant to the users' interactions with and navigation of the content offered by the website are stored in the repository 68A associated with the content server 68 and are further indexed to a particular user (e.g., using authorized information such as log-in information, tracking cookies, internet protocol (IP) addresses, or other information which the content server 68 may utilize to identify the user).

In another example, the information relevant to users' interactions with and/or navigation of the content offered by the website may also or alternatively be stored on user-side devices such as the user computing device 20, for example. Storing data on a user device may be particularly advantageous where, for example, a user has not logged onto the website content server 68 and is anonymously navigating the content provided by the website content server 68. In this case, the information relevant to the user's interactions with and navigation of the content offered by the website content server 68 may be stored, for example, in a tracking cookie placed onto the user computing device 20 using well known techniques. Because the manner by which the user device 20 is used to access and navigate the website offered by the website content server 68, the manner by which the website content server 68 makes content available to the user device 20, and the manner by which the website usage is monitored are all well known in the art, they will not be discussed herein for the sake of brevity.

For performing the functions required of the computing devices 20, 68, the example computing devices 20, 68 include computer executable instructions that reside in program modules, which may include routines, programs, objects, components, data structures, etc. that perform particular tasks or implement particular abstract data types. Accordingly, one of ordinary skill in the art will appreciate that the computing devices 20, 68 may be any device having the ability to execute instructions such as, by way of example, a personal computer, a mainframe computer, a personal-digital assistant ("PDA"), a tablet, a cellular telephone, a mobile device, an e-reader, or the like. Furthermore, while the computing devices 20, 68 within the system 10 are illustrated as respective single devices, those having ordinary skill in the art will also appreciate that the various tasks disclosed hereinafter may be practiced in a distributed environment having multiple processing devices linked via a local or wide-area network whereby the executable instructions may be associated with and/or executed by one or more of multiple processing devices.

More particularly, the user computing device 20, which may in some examples be representative of all of the computing devices illustrated in FIG. 1 and/or other users' devices, performs various tasks in accordance with the executable instructions. Thus the example user computing device 20 includes one or more processing units 22 and a system memory 24, which may be linked via a bus 26. Without limitation, the bus 26 may be a memory bus, a peripheral bus, and/or a local bus using any of a variety of well-known bus architectures. As needed for any particular purpose, the example system memory 24 includes read only memory (ROM) 28 and/or random access memory (RAM) 30. Additional memory devices may also be made accessible to the processing device 20 by means of, for example, a hard disk drive interface 32, a removable magnetic disk drive interface 34, and/or an optical disk drive interface 36. As will be understood, these devices, which may be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated tangible, computer-readable media allow for the nonvolatile storage of computer readable instructions, data structures, program modules, and other data for the user computing device 20. Those of ordinary skill in the art will further appreciate that other types of tangible, computer readable media that can store data may be used for this same purpose. Examples of such media devices include, but are not limited to, magnetic cassettes, flash memory cards, digital videodisks, Bernoulli cartridges, random access memories, nanodrives, memory sticks, and other read/write and/or read-only memories.

A number of program modules may be stored in one or more of the memory/media devices. For example, a basic input/output system (BIOS) 44, containing the basic routines that help to transfer information between elements within the user computing device 20, such as during start-up, may be stored in ROM 28. Similarly, the RAM 30, the hard drive 38, and/or the peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example, via a network connection.

A user may enter commands and information into the user computing device 20 through input devices such as a keyboard 54 and/or a pointing device 56. While not illustrated, other input devices may include a microphone, a joystick, a game pad, a scanner, a touchpad, a touch screen, a motion sensing input, etc. These and other input devices would typically be connected to the processing unit 22 by means of an interface 58 which, in turn, may be coupled to the bus 26. Input devices may be connected to the processor 22 using interfaces such as, for example, a parallel port, game port, firewire, universal serial bus (USB), or the like. To receive information from the user computing device 20, a monitor 60 or other type of display device may also be connected to the bus 26 via an interface, such as a video adapter 62. In addition to the monitor 60, the user computing device 20 may also include other peripheral output devices such as a speaker 53.

As further illustrated in FIG. 1, the user computing device 20 has logical connections to one or more remote computing devices, such as the content server 68 which, as noted above, may include many or all of the elements disclosed above relative to the user computing device 20 as needed for performing its assigned tasks. By way of further example, the website content server 68 may include executable instructions stored on a non-transient memory device for, among other things, presenting webpages, handling search requests, providing search results, providing access to context related services, sending emails, managing lists, managing shopping carts, presenting requested user specific information, etc. Communications between the user computing device 20 and the content server 68 may be exchanged via a further processing device, such as a network router 72, that is responsible for network routing. Communications with the network router 72 may be performed via a network interface component 73. Thus, within such a networked environment, e.g., the Internet, World Wide Web, LAN, or other like type of wired or wireless network, it will be appreciated that program modules depicted relative to the user computing device 20, or portions thereof, may be stored in the memory storage device(s) of the content server 68. Additionally, it will be understood that, in certain circumstances, various data of the application and/or data utilized by the content server 68 and/or the user computing device 20 may reside in the "cloud." In other words, the data repository may reside in any suitable location. For example, the data repository 68A may reside, without limitation, on the user device 20, directly connected to the user device 20, with the content server 68, in the "cloud," and/or any combination thereof, e.g., the user device 20 may periodically download data from the "cloud" or the content server 68 and store the data on the user device 20.

As briefly disclosed above, the information gathered from website usage monitoring may then be used to supplement the web content being offered by the content server 68. While such information could be provided to users of the website in a multitude of ways, the present disclosure recognizes that more often nowadays e-commerce websites are designed, organized, and/or navigated according to a series, for example, of bins, classes, classifications, collections, departments, divisions, families, genres, groupings, hierarchies, sections, sets, species, types, and/or other categories (and subcategories) that correspond to different products, services, and so on. The websites make such categories accessible to users through menus, sidebars, and/or other website navigation tools, for example. Users rely, heavily at times, on these categories and website navigation tools to navigate multiple levels of categories in an effort to locate certain products or services. Thus, utilizing data based on monitored user interactions, the system 10 assists users in navigating a website based on their prior navigations of such categories and/or other users' prior navigations of such categories.

Figure 2:
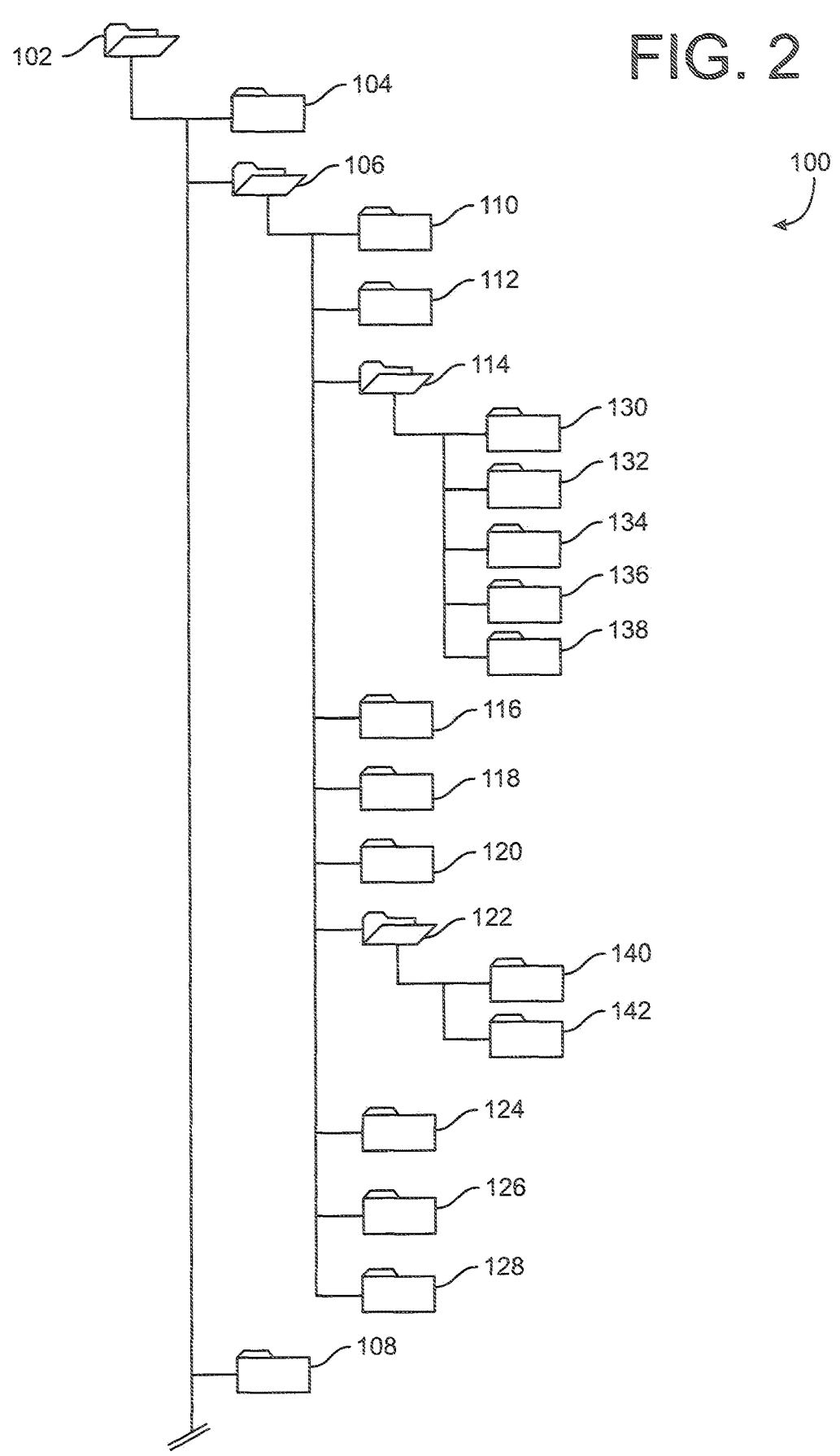
FIG. 2 is an electronic file tree representing an example organization of categories of website content and/or data representing the website content.

That said, in one example the website content server 68 provides data from the repository 68A representing the website content organized into multiple categories. Organization of the categories of website content and/or data representing website content may be analogized to an electronic folder tree 100 as shown in FIG. 2. In some examples, the website content server 68 may in fact store data representing website content in an electronic folder structure in the repository 68A similar to the electronic folder tree 100 shown in FIG. 2. In other examples, however, the folder tree 100 may be merely representative of the categories of web content organized on a website.

Nonetheless, in one example each folder in the example folder tree 100 represents a different category of data and/or web content. For example, a top-level folder 102 may represent a product category of web content having products available for sale on a website, as opposed to a resources category, a services category, an international content category, a repair parts category, or other categories, for instance. Within the example top-level folder 102 in FIG. 2 are at least three example folders 104, 106, 108. Each of the folders 104, 106, 108 may pertain in one example to categories of product such as pneumatic products, electrical products, and lubricating products, respectively, for instance. One of these three folders 106, which corresponds to the electrical products in this example, has ten of its own folders 110, 112, 114, 116,118, 120, 122, 124, 126, 128. Each of these folders 110, 112, 114, 116, 118, 120, 122, 124, 126, 128 may in one example pertain to a category of electrical products, such as electrical connectors, electrical wire cutters, electrical tape, and the like. Still further, the example folder 114 has five additional folders 130, 132, 134, 136, 138, and the example folder 122 has two additional folders 140, 142. The example folders 130, 132, 134, 136, 138, 140, 142 may contain web content corresponding to individual products.

It should be understood that the folder tree 100 shown in FIG. 2 is merely an example of one possible way in which web content and/or data representing web content may be organized. The top-level folder 102, for instance, could have thousands of sub-folders representing different categories of data, or the folders 136, 140 could have many more iterations of sub-folders. What's more, the present disclosure analogizes here to the folder tree 100 for purposes of explanation only.

Figure 3:
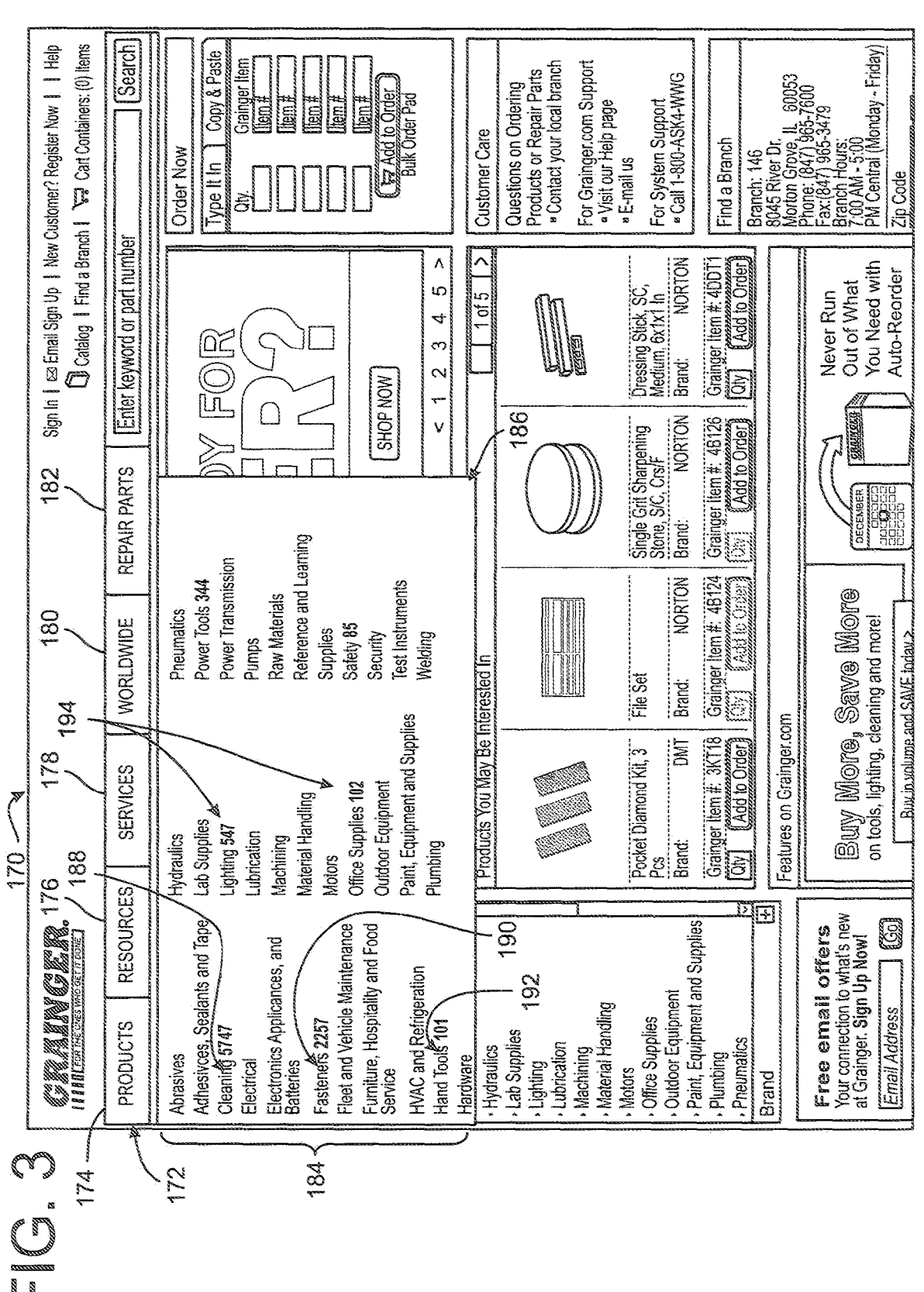
FIG. 3 is a screenshot of an example webpage having numerous categories of web content and measures of user traffic associated with at least some of those categories of web content.

With reference now to FIG. 3, an example webpage 170 of an e-commerce website includes a menu 172 providing, amongst other features, links to five example categories of web content. The five categories of web content shown in the example menu 172 include products 174, resources 176, services 178, worldwide content 180, and repair parts 182. The products 174 category of web content has been selected, revealing example categories 184 of product in a sub-menu 186. Each category 184 of product may contain a hyperlink that redirects users of the website to further web content when clicked. The webpage 170 provides these menus 174, 186 as website navigation tools that allow users to navigate to desired web content by "drilling down" through categories and subcategories of web content. Although this disclosure refers to "categories" and "subcategories" of web content, it should be understood that this nomenclature is used merely for purposes of explanation and that the present disclosure is in no way limited to two levels—or any fixed number of levels—of categories/subcategories.

In keeping with the folder tree 100 analogy of FIG. 2, the top-level folder 102 may represent the products 174 category of web content in FIG. 3, for example. Further, the three folders 104, 106, 108 within the top-level folder 102 of FIG. 2 may represent from the webpage 170 of FIG. 3 a category of "Cleaning" products 188, a category of "Fasteners" products 190, and a category of "Hand Tools" products 192, respectively. Although not shown in FIG. 2, folders representing web content and/or data associated with each of the other twenty-nine categories 184 of product in the sub-menu 186 in FIG. 3 may exist underneath the top-level folder 102.

To provide users of the website with information as to how other users are navigating to different webpages of the website, the system 10 is configured to indicate on at least one webpage, such as the webpage 170 for instance, a measure of recent user traffic associated with one or more categories of web content. Example measures of user traffic 194 are displayed next to seven of the categories 184 within the sub-menu 186 on the webpage 170 in FIG. 3. More specifically, the example measures of user traffic 194 in FIG. 3 represent a number of visits that have occurred recently within certain product categories 184 including "Cleaning" (5,747 visits), "Fasteners" (2,257 visits), "Hand Tools" (101 visits), "Lighting" (547 visits), "Office Supplies" (102 visits), "Power Tools" (344 visits), and "Safety" (85 visits). Though omitted from the higher levels of web content in FIG. 3 such as those in the menu 172, measures of user traffic may in some examples be displayed for more than one level of categories, if not all levels of categories. And further, while the measures of user traffic 194 shown here include numerical counters, the measures of user traffic are not so limited. The measures of user traffic may in other examples comprise percentages, popularity indicators, alterations to text and/or other colors, alterations to text and/or other size, outlined images, outlined text, icons, graphics, borders, animations, and so on. Of course, the examples disclosed herein are equally applicable to all of these measures of user traffic, whether explicitly stated or not.

The present disclosure contemplates a wide variety of ways in which to count and/or display the measures of user traffic 194 associated with categories of web content. As described further below with respect to displaying the measures of user traffic 194, in some examples users of the website may view and/or freely switch between measures of user traffic 194 associated with the user's own navigation tendencies, with another user, with a subset of users, with multiple subsets of users, or any other suitable user grouping. With respect to counting the measures of user traffic 194, in one example the measures of user traffic 194 may be tallied according to a recent period of time, such as, for instance, the last ten days, the last three weeks, the last two months, or any other desired period. In another example, the measures of user traffic 194 may be displayed based on a certain number of most-recent visits (e.g., the last 10,000 visits) to or within a category of web content. In some examples, the system 10 may count multiple visits by a same user. In examples where it is desirable to obtain a broader spectrum of data from a higher number of users rather than data from a smaller number of users that visit the website more frequently, however, the system 10 may be configured so as not to count visits to categories by the same user that exceed a permissible rate. For instance, the system 10 may only count the same user's visits to the category of "Cleaning" products 188 at a maximum rate of twice per week, even if the same user visits the category of "Cleaning" products 188 ten times in ten different web browsing sessions in a week. Conversely, the system 10 may be configured in other examples to only count activity of users that visit the website frequently (e.g., twice per week), as they are more likely to be familiar with the website than those who visit less frequently. In other words, navigation tendencies of experienced website users may be more valuable than navigation tendencies of less-experienced website users.

Yet further, in the example of FIG. 3, the system 10 has been configured to display the measures of user traffic 194 for seven of the most-visited categories 184 within the product 174 category of web content. Yet in other examples, the webpage 170 may display the measures of user traffic 194 for a different number of most-visited categories 184 or for all the categories 184. In a still further example, the system 10 may be configured to cause the webpage 170 to display the measures of user traffic 194 for all categories of web content on all levels for all visits since the website began monitoring user interactions. In some examples, moreover, the system 10 may cause the webpage 170 to display the measures of user traffic 194 only after a certain category of web content experiences a minimum number of visits (e.g., five visits) or a minimum rate of visits (e.g., five visits per week).

Further, regarding the counting of visits, one of ordinary skill in the art will appreciate that the system 10 does not necessarily require users to click the links corresponding to the categories 184 in the sub-menu 186 because there may be more than one way to arrive at a category of web content. Similarly, the system 10 may be configured to count a visit only after a user has spent a minimum amount of time within the selected category of web content. For example, such a filter would be advantageous where a user enters a category of website content erroneously and quickly clicks a "back" button on a web browser to exit that category of website content. The filter would also be advantageous where a user enters a category of website content, fails to find content for which the user is looking, and quickly exits that category of website content. In yet a further example, the system 10 may additionally or alternatively employ a weighting system whereby visits where users spend more time within a category of website content count more than visits where users spend a brief amount of time within the category. In such an example, either a point system could be used, or every block of time (e.g., six minutes) spent within the category would count as another visit, for instance. In still another example, instead of weighting by time, the system 10 may weight visits by number of links clicked within a particular category of web content. In one example, the system 10 may also or alternatively weight user visits more heavily where a user ultimately purchases a product or service within a particular category of web content.

It should be understood that the present disclosure contemplates that combinations of all of these example configurations, features, filters, options, and the like may be employed by the system 10 and/or the web site in some examples. Likewise, in some examples, the present disclosure further contemplates providing users with an ability to control some, many, or even all of these example configurations, features, filters, options, and the like. For instance, to allow the user to control such example configurations, features, filters, options, and the like, a sidebar (not shown) or a menu (not shown) could be provided on the webpage 170.

To enable a user of the website to view navigation tendencies of users belonging to a certain profession, of a group of colleagues, of another particular user, and/or the like, the system 10 in some examples limits the measures of user traffic 194 to display visits corresponding to monitored user interactions of a subset of users. As disclosed above, the system 10 is often able to identify particular users by account information, IP addresses, tracking cookies, purchase history, etc. One aspect to user identities, moreover, typically includes information as to a profession, an employer, or some other group with which each user is associated. Therefore, the system 10 is able to compute and display navigation tendencies pertaining to a specific subset of users that are members of, relate to, or otherwise associate with an identifiable group. Thus, the system 10 may in one example allow a user to choose an identifiable group of website users and view the measures of user traffic 194 specifically attributable to that chosen group of users. In another example, the system 10 may permit the user to choose more than one group of users for which to view the measures of user traffic 194. In still another example, once the system 10 identifies a user browsing the website, the system 10 may display only those measures of user traffic 194 that are attributable to a group to which the identified user belongs or chooses for purposes of this search. For instance, if the system 10 identifies a website user as a plumber, the system 10 may in some examples only display those measures of user traffic 194 that are specifically attributable to plumbers that have previously navigated the website. In this way, the user can navigate through categories of the website based on the navigation tendencies of other users having the same interests. Moreover, all of these options may in some examples be controlled by the user in the sidebar, the menu, or the like. Put still another way, a user can switch, for example, between measures of user traffic 194 specific to the user, measures of user traffic 194 for all users, measures of user traffic 194 for similarly-situated users, measures of user traffic 194 for expert users, and so on.

Viewing the navigation tendencies of another user or group of users is interesting and oftentimes useful, especially where that user or those users are familiar with the website, because it exposes users that may be less familiar with the website to other categories from which more-experienced users are buying. Users that are less familiar with the website may not know, for example, that the web site sells a particular type of product that is useful for their own applications.

Figure 4:
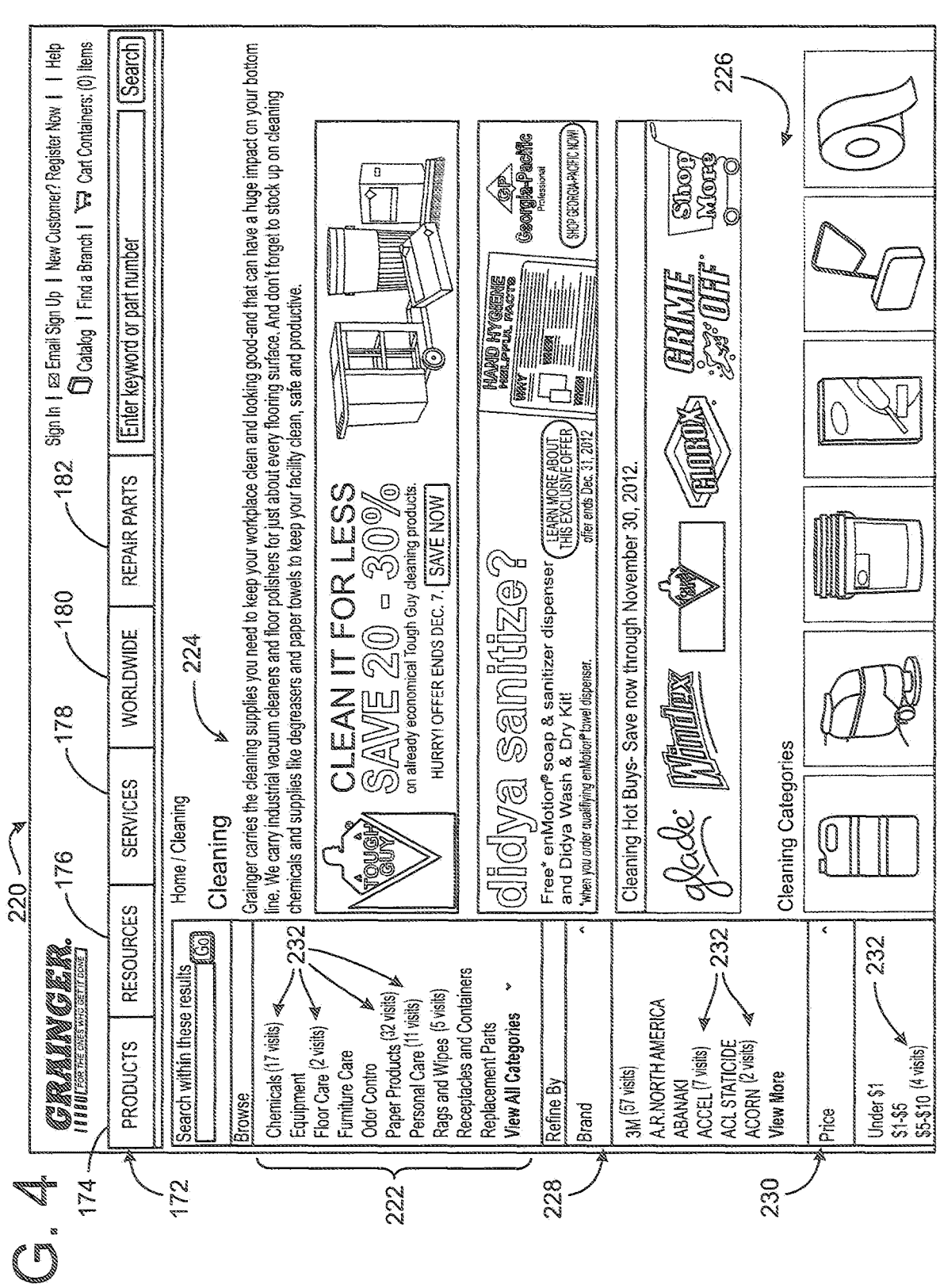
FIG. 4 is a screenshot of an example webpage that a user may be routed to after selecting one of the categories shown in FIG. 3.

Once a user selects one of the categories 184 of products from the sub-menu 186 in FIG. 3, such as the category of "Cleaning" products 188, for example, the user is redirected to another webpage 220 dedicated to cleaning products, as shown in FIG. 4. The example webpage 220 includes, amongst other web content, categories of cleaning products in list form 222, a description 224 of web content on the webpage 220, categories of cleaning products in graphical form 226, a list of "Brands" 228 offering cleaning products, and a list of "Price[s]" 230 by which to sort cleaning products.

With reference to the electronic folder tree 100 of FIG. 2, the ten folders 110, 112, 114, 116, 118, 120, 122, 124, 126, 128 may represent the ten categories of cleaning products 222, respectively, shown on the webpage 220 in FIG. 4. In other words, the user has navigated into the products category 174 of web content of FIG. 3 (represented by the top-level folder 102 of FIG. 2) and subsequently into the category of "Cleaning" products 188 of FIG. 3 (represented by the folder 106 of FIG. 2). Although the folder tree 100 of FIG. 2 is not fully shown or expanded, each of the ten folders 110, 112, 114, 116, 118, 120, 122, 124, 126, 128 representing the ten categories of cleaning products 222, respectively, may include folders, such as folders 130, 132, 134, 136, 138, 140, 142, for example, that represent web content and/or data for products. The website could display web content from those folders 130, 132, 134, 136, 138, 140, 142 when a link representing one of the ten categories of cleaning products 222 of FIG. 4 is selected.

Further, similar to the measures of user traffic 194 associated with the categories 184 shown in the webpage 170 of FIG. 3, one or more measures of user traffic 232 may be displayed next to one or more of the categories 222 shown in the webpage 220 of FIG. 4. While it should be understood that one or more of the example configurations, features, filters, options, and the like disclosed above may be equally applicable to the measures of user traffic 232 shown in FIG. 4, it should also be understood that in some examples measures of user traffic may be configured differently across different levels of categories.

For example and without limitation, lower-level categories (i.e., categories contained within at least one other category), such as the cleaning product categories 222, for instance, may receive less visits because they contain more narrow, more-detailed, or more-specialized web content than higher-level categories, such as the general product category 174. To generate meaningful measures of user traffic, therefore, the system 10 may display visits counted during a longer period of time for the lower-level categories in comparison to a period of time associated with measures of user traffic displayed for higher-level categories. So while a measure of user traffic associated with a higher-level category may show a count of visits from the last two weeks, for example, a measure of user traffic associated with a lower-level category may show a count of visits from the last two months. By way of further example, the system 10 may cause the website to display the measures of user traffic differently based on whether the user is viewing navigation tendencies for a group of users or for a single user. For instance, when viewing the navigation tendencies of a group of users, the website may display measures of user traffic for categories that have experienced at least thirty recent visits. On the other hand, when viewing the navigation tendencies of an individual user, the website may display measures of user traffic for categories that have experienced at least one recent visit.

Likewise, the system 10 in one example may also be configured to display measures of user traffic associated with different subsets of users depending on a category to which a current user has navigated. For instance, if the user navigates from a category of electrical connector products to a category of pipe cleaning products, the system 10 may switch the measures of user traffic from representing navigation tendencies associated with electricians to representing navigation tendencies associated with plumbers. In one example, the website may prompt the user to allow recommended changes as to which subset of users the measures of user traffic represent, or which limits are placed on the way in which measures of user traffic are counted. For example, where there is too little data for a meaningful display of measures of user traffic, the website may prompt the user for permission to change the subset of users with which the measures of user traffic are associated, and/or the website may prompt the user for permission to expand a time period from which the measures of user traffic are associated.

The example webpage 220 in FIG. 4 also shows that the measures of user traffic 232 are displayed in one example for the list of "Brands" 228 offering cleaning products and the list of "Price[s]" 230 by which to sort cleaning products. As those having ordinary skill in the art will understand, products and/or services available through e-commerce websites may be sorted, indexed, filtered, and/or the like according to more than one convention of categorization of web content. The measures of user traffic 232 shown in FIG. 4 thus provide an example as to how the present disclosure may be utilized with more than one convention of categorization of web content at a time.

Figure 5:
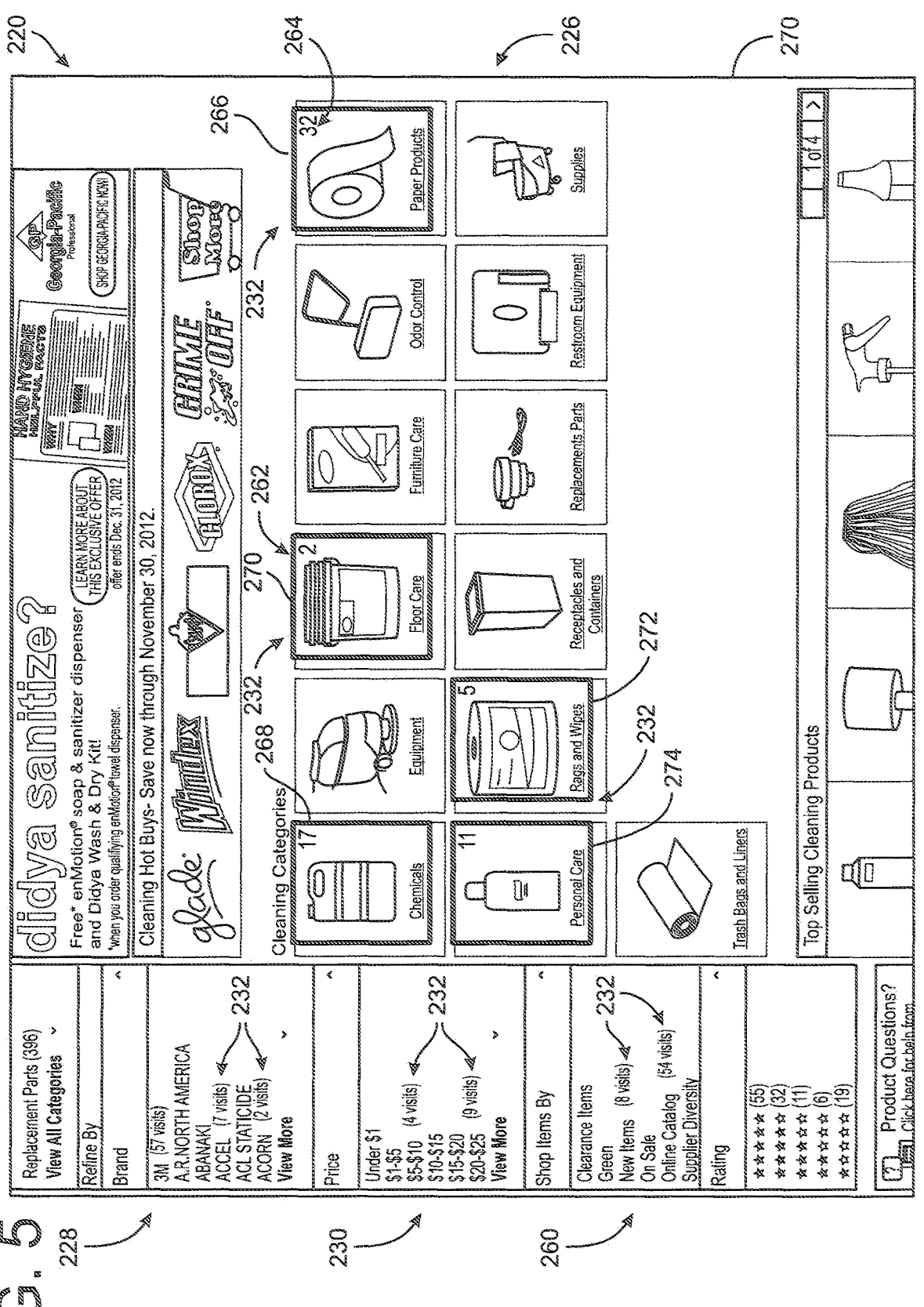
FIG. 5 is a screenshot of an example webpage showing additional examples of measures of user traffic.

Turning now to FIG. 5, a lower portion 270 of the webpage 220 of FIG. 4 is shown. For one, the lower portion 270 of the example webpage 220 shows that the measures of user traffic 232 are used with still another convention of categorization of web content. In particular, the measures of user traffic 232 are displayed in association with categories 260 of products including "Clearance Items," "Green," "New Items," "On Sale," "Online Catalog," and Supplier Diversity." The lower portion of the example webpage 220 also shows a better view of the categories of cleaning products in graphical form 226. In the example shown here, the webpage 220 includes, amongst other web content, measures of user traffic 232 associated with some of the categories of cleaning products in graphical form 226. More particularly, these example measures of user traffic 232 are shown as borders 262 outlining images representing the categories of cleaning products 226. These example measures of user traffic 232 also include numerical indicators 264 that represent a number of visits similar to the measures of user traffic 194, 232 of FIGS. 3-4, respectively.

Further, the borders 262 may in some examples be color-coordinated such that some colors represent more-trafficked categories while other colors represent less-trafficked categories. For instance, borders 266, 268 may be colored red, representing that "Paper Products" and "Chemicals" are "hot" cleaning categories 226, as they have had thirty-two and seventeen recent visits, respectively. Relative to the other categories 226, these two categories have experienced a high number of visits. Categories 226 of "Floor Care" and "Rags and Wipes" cleaning products, on the other hand, have only experienced, respectively, two and five visits recently. Thus borders 270, 272 associated with those categories 226 may be colored blue, representing fewer recent visits. In addition, a category of "Personal Care" cleaning products having eleven recent visits has experienced a medium level of traffic. A border 274 associated with "Personal Care," therefore, may be colored orange to represent the medium level of user traffic.

Figure 6:
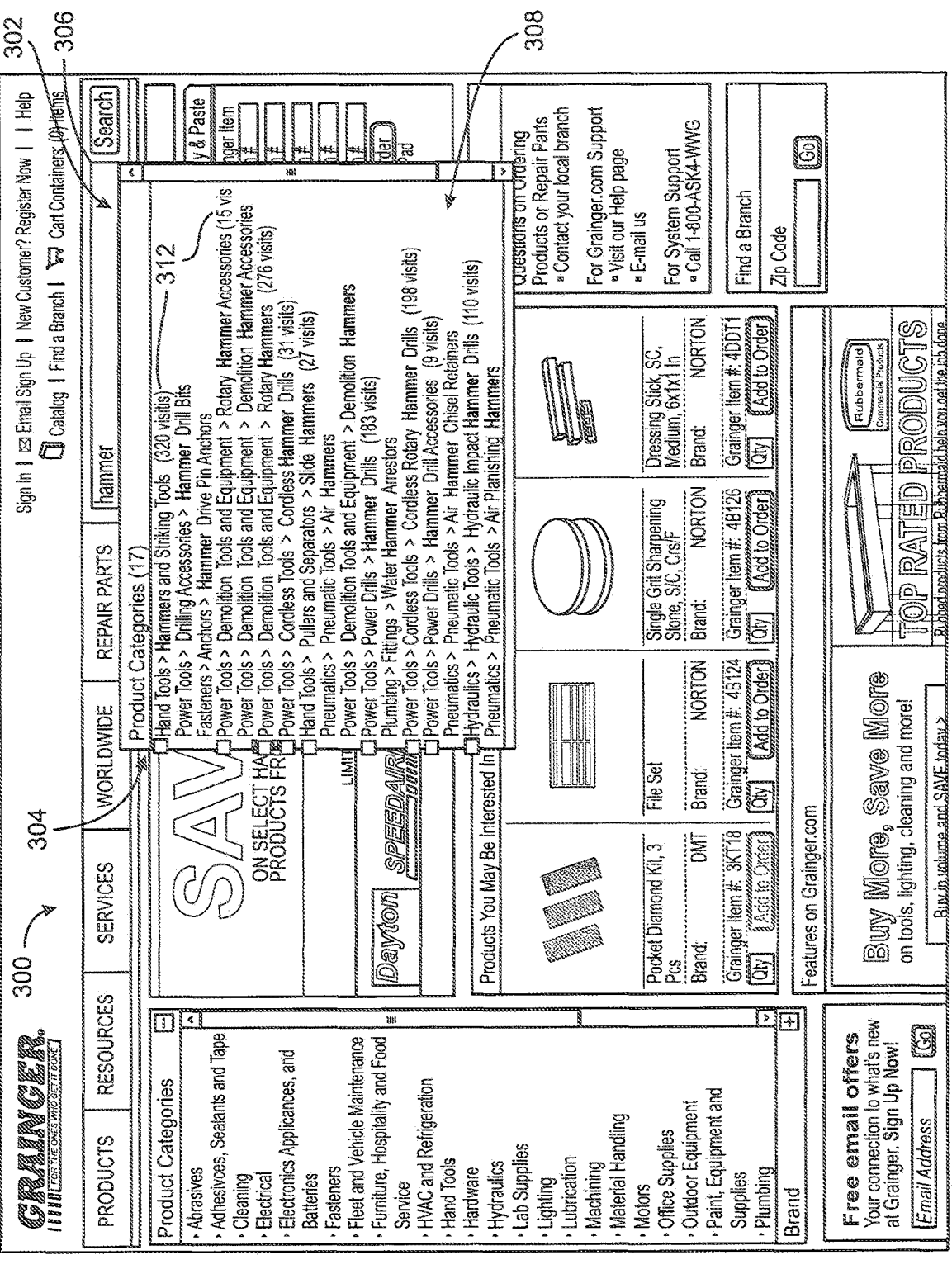
FIG. 6 is a screenshot of an example webpage showing still another example way in which measures of user traffic may be displayed.

To indicate navigation tendencies to users performing keyword searches, an example webpage 300 as shown in FIG. 6 provides in one example a dropdown box 302 containing measures of user traffic 304 beneath a keyword search box 306. In response to a part of or a whole keyword typed into the keyword search box 306, such as "hammer," for example, the system 10 may cause the webpage 300 to display auto-complete categories of products 308 that relate to typed letters, a word, or words. Although the auto-complete listings here pertain to categories of products 308, the present disclosure contemplates that the auto-complete listings could pertain to a wide variety of categorical web content such as categories of keywords, brand names, and sale items, for example only.

Further, the system 10 may also cause the webpage 300 to display the measures of user traffic 304 next to the auto-complete categories of products 308. In the example of FIG. 6, one of the example measures of user traffic 304 includes colored squares 310. The colored squares 310 may be colored according to a convention similar to that disclosed above with respect to the measures of user traffic 232 of FIG. 5. The example colored squares 310 here include colors ranging from blue to green to orange to red. In this example, blue squares represent less-trafficked categories of products

308. Green squares represent a higher level of user traffic than blue squares. Orange squares represent more user traffic than green squares. And red squares represent the most amount of recent user traffic. Moreover, although the auto-complete categories of products 308 are shown to be sorted by level of relevance in FIG. 6, in another example the auto-complete categories of products 308 may be sorted by level of user traffic, with the most-trafficked auto-complete categories of products 308 shown towards a top of the dropdown box 302, for instance. The present disclosure also contemplates multiple levels of sorting, such as by product category and then by popularity, for example. Further, another example of the measures of user traffic 304 includes numerical indicators 312, which may be displayed in conjunction with or as an alternative to the colored squares 310.

To allow a user to view the user's own navigation tendencies, the system 10 may in some examples cause a webpage, such as a webpage 340 of FIG. 7, to display measures of user traffic 342 that are attributable only to that user. As shown, the example measures of user traffic 342 for various categories 344, 346, 348 of web content are entirely attributable to the user in this example. The example measures of user traffic 342 may even be displayed next to categories that concern refining searches by parameter choices, such as the categories 346, 348 in FIG. 7. Further, as previously disclosed, the user may have the option to control through a sidebar or a menu which subset of users' navigation tendencies are displayed in the various measures of user traffic. Likewise, the user may also have the option to choose to view measures of user traffic that are solely attributable to the user. Also through the use of the sidebar or the menu, the user may be able to view the navigation tendencies of another specific user, to share navigation tendencies with another specific user or group, or to request to view navigation tendencies of another specific user or group where not publicly available.

The disclosed systems and methods may also be advantageous for employees of a business operating the website. For instance, a customer service representative assisting a website user via a chat feature or a telephone call may view navigation tendencies of a particular group of users with which the user may associate. The customer service representative could then make recommendations to the user based on the navigation tendencies of the group of users.

To display the measures of user traffic on the webpages in the example forms of percentages, popularity indicators, alterations to text colors, alterations to text size, outlined images, outlined text, icons, graphics, borders, animations, and so on, as disclosed above, the system 10 may employ standard webpage design techniques. For example and without limitation, standard HyperText Markup Language (HTML) allows for the modification of webpage content such as adding webpage textual elements and active links. Those of ordinary skill in the art will readily appreciate how to use standard HTML programming techniques to add such percentages, popularity indicators, alterations to text colors, alterations to text size, outlined images, outlined text, icons, graphics, borders, animations, and the like to a webpage based on monitored user interactions with a website.

While various concepts have been disclosed in detail, it will be appreciated by those of ordinary skill in the art that various modifications and alternatives to those concepts could be developed in light of the overall teachings of the disclosure. For example, while various aspects of the present disclosure have been disclosed in the context of functional modules and illustrated using block diagram format, it is to be understood that, unless otherwise stated to the contrary, one or more of the disclosed functions and/or features may be integrated in a single physical device and/or a software module, or one or more functions and/or features may be implemented in separate physical devices or software modules. It will also be appreciated that a detailed discussion of the actual implementation of each aspect of the disclosure is not necessary for an enabling understanding of the disclosure. Rather, the actual implementation of the systems and methods would be well within the routine skill of an engineer, given the disclosure herein of the attributes, functionality, and inter-relationship of the various components in the system. Therefore, a person of ordinary skill in the art will be able to practice the disclosure set forth in the claims without undue experimentation. It will be additionally appreciated that the particular concepts disclosed are meant to be illustrative only and not limiting as to the scope of the disclosure which is to be given the full breadth of the appended claims and any equivalents thereof.

What is claimed is:

1. A non-transitory computer-readable media having stored thereon executable instructions which, when executed by a processing device, perform steps comprising:

receiving from a user via a user interface element displayed as a component of a webpage a free form search query;

in response to a part or a whole of a keyword being typed into the user interface element as the free form search query retrieving from a repository of links to further webpages a plurality of links to a corresponding plurality of further webpages that have been linked within the repository of links to the part or the whole of the keyword;

sorting the plurality of links to the corresponding plurality of further webpages using a tendency metric established for the user prior to receiving the free form search query;

displaying in association with the user interface element as a plurality of auto-completions of the search query the sorted plurality of links to the corresponding plurality of further webpages;

in response to a detected selection of a one of the sorted plurality of links to a corresponding one of the plurality of further webpages, using the selected links to retrieve the corresponding one of the further webpages; and displaying the retrieved corresponding one of the further webpages.

2. The non-transitory computer-readable media as recited in claim 1, wherein the plurality of auto-completions of the search query are displayed in a drop-down menu type user interface element.

3. The non-transitory computer-readable media as recited in claim 1, wherein the tendency metric is a measured level of traffic by the user to the plurality of further webpages.

4. The non-transitory computer-readable media as recited in claim 1, wherein the tendency metric is a measured popularity of an item represented by each of the plurality of webpages to the user.

5. The non-transitory computer-readable media as recited in claim 1, wherein the user is an individual.

6. The non-transitory computer-readable media as recited in claim 1, wherein the user is a one of a predefined group of individuals.

7. The non-transitory computer-readable media as recited in claim 1, wherein a one or more of the sorted plurality of links to the corresponding plurality of further webpages is displayed with a numerical indicator of the tendency metric.

8. The non-transitory computer-readable media as recited in claim 1, wherein a one or more of the sorted plurality of links to the corresponding plurality of further webpages is displayed with a highlighting relative of a remainder of the sorted plurality of links to the corresponding plurality of further webpages.

* * * * *